United States Patent [19]

Staveley

[11] Patent Number: 5,093,567

[45] Date of Patent: Mar. 3, 1992

[54] HELMET SYSTEMS WITH EYEPIECE AND EYE POSITION SENSING MEANS

[75] Inventor: Christopher B. Staveley, Chatham, United Kingdom

[73] Assignee: GEC-Marconi Limited, England

[21] Appl. No.: 550,155

[22] Filed: Jul. 9, 1990

[30] Foreign Application Priority Data

Jul. 14, 1989 [GB] United Kingdom ............... 8916206

[51] Int. Cl.$^5$ .......................... G01V 9/04; A61B 3/14; G09G 3/02

[52] U.S. Cl. .................................. 250/221; 250/226; 340/705; 351/210

[58] Field of Search ............ 250/221, 216, 226, 206.1; 340/705; 351/210, 209; 350/172, 173, 174

[56] References Cited

U.S. PATENT DOCUMENTS

| | | | |
|---|---|---|---|
| 4,439,755 | 3/1984 | La Russa | 340/705 |
| 4,722,601 | 2/1988 | McFarlane | 340/705 |
| 4,852,988 | 8/1989 | Velez et al. | 351/210 |
| 4,961,626 | 10/1990 | Fournier, Jr. et al. | 340/705 |
| 4,994,794 | 2/1991 | Price et al. | 340/705 |

OTHER PUBLICATIONS

Stephenson et al., "A Helmet-Mounted Sight System for Fighter Aircraft", GEC Journ. of Sci. & Tech., vol.46, No. 1, (1980), pp. 33-38.

Primary Examiner—David C. Nelms
Assistant Examiner—Michael Messinger
Attorney, Agent, or Firm—Kirschstein, Ottinger, Israel & Schiffmiller

[57] ABSTRACT

There is disclosed two helmet systems, each comprising a helmet (11) and, carried by the helmet (11), an optical arrangement (13). In each system, the optical arrangement (13) both provides a collimated display superimposed on the helmet wearer's view of the forward scene through an eyepiece (15 or 50) of the arrangement (13), and senses the angular position of that eye of the helmet wearer looking through the eyepiece (15 or 50) with respect to the helmet axes. The optical arrangement (13) senses such angular position by sensing the position, within a sensing area of a sensor (37 or 72), of the point focus of infra-red radiation, from an infra-red point source (35 or 71A), reflected by the eye, and producing an electrical output representative of this position. In one helmet system the eyepiece (15) is of the open optics type and in the other the eyepiece (50) is of the solid optics type.

3 Claims, 8 Drawing Sheets

U.S. Patent     Mar. 3, 1992     Sheet 1 of 8     5,093,567
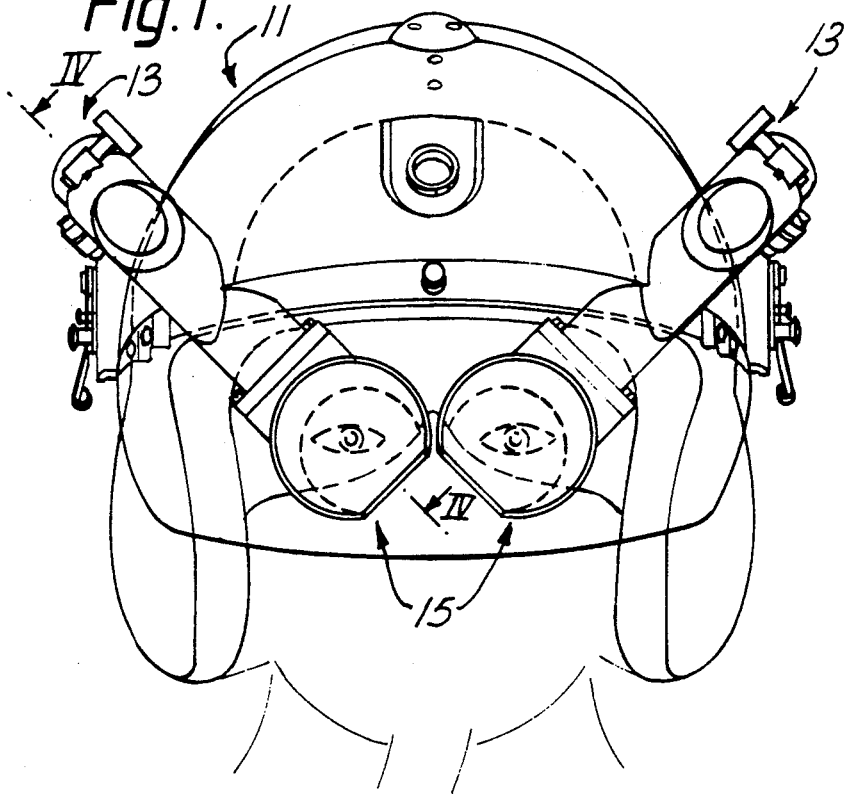
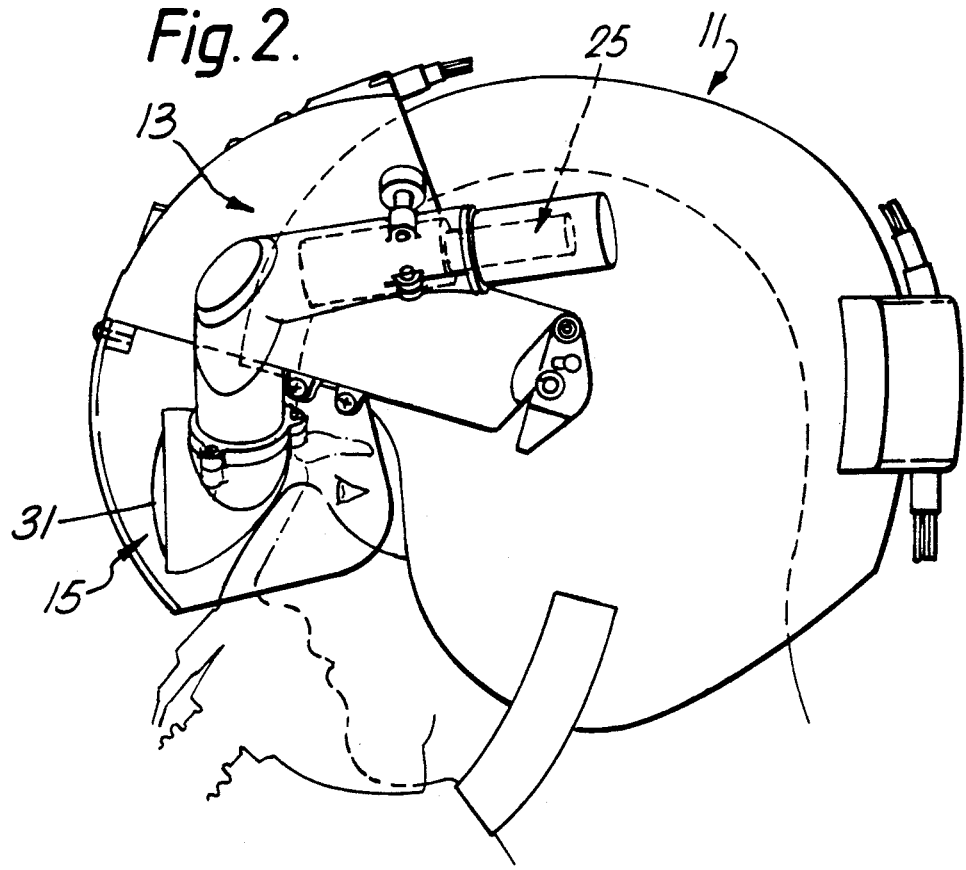

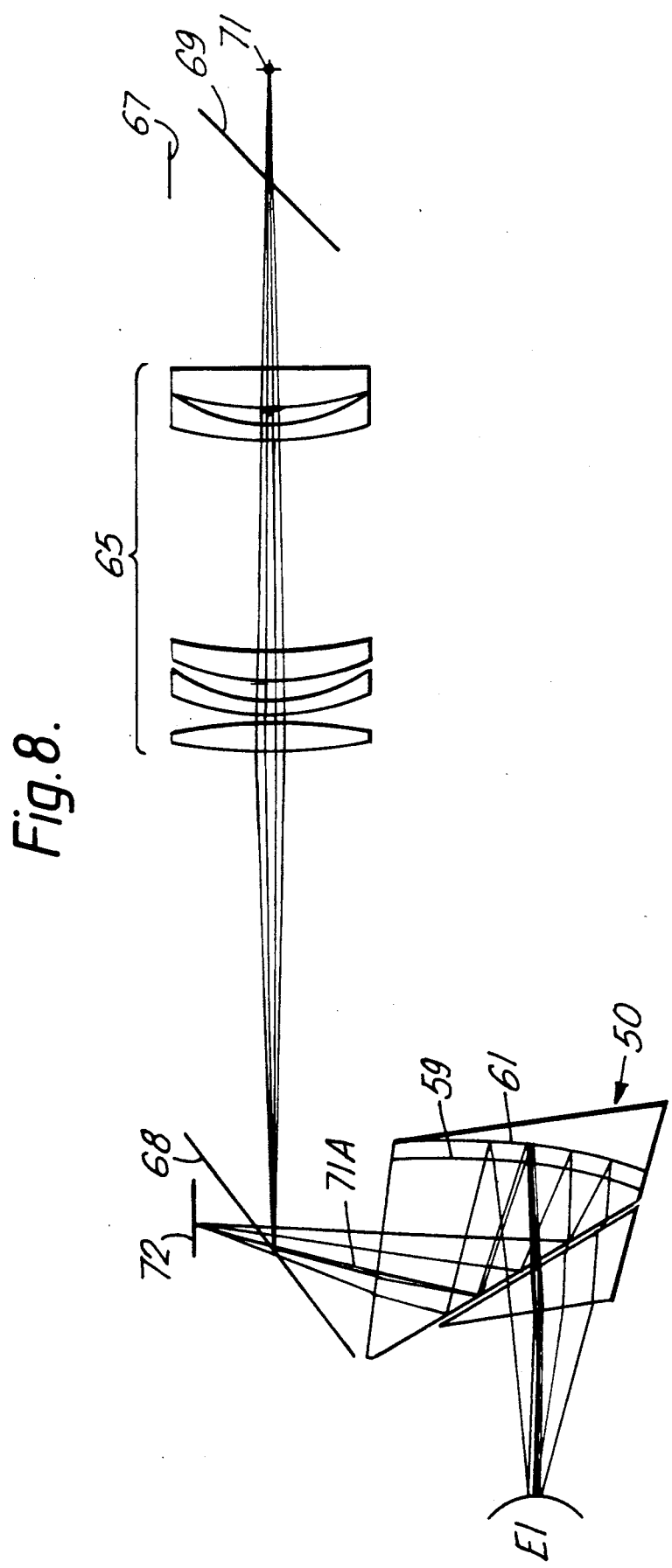

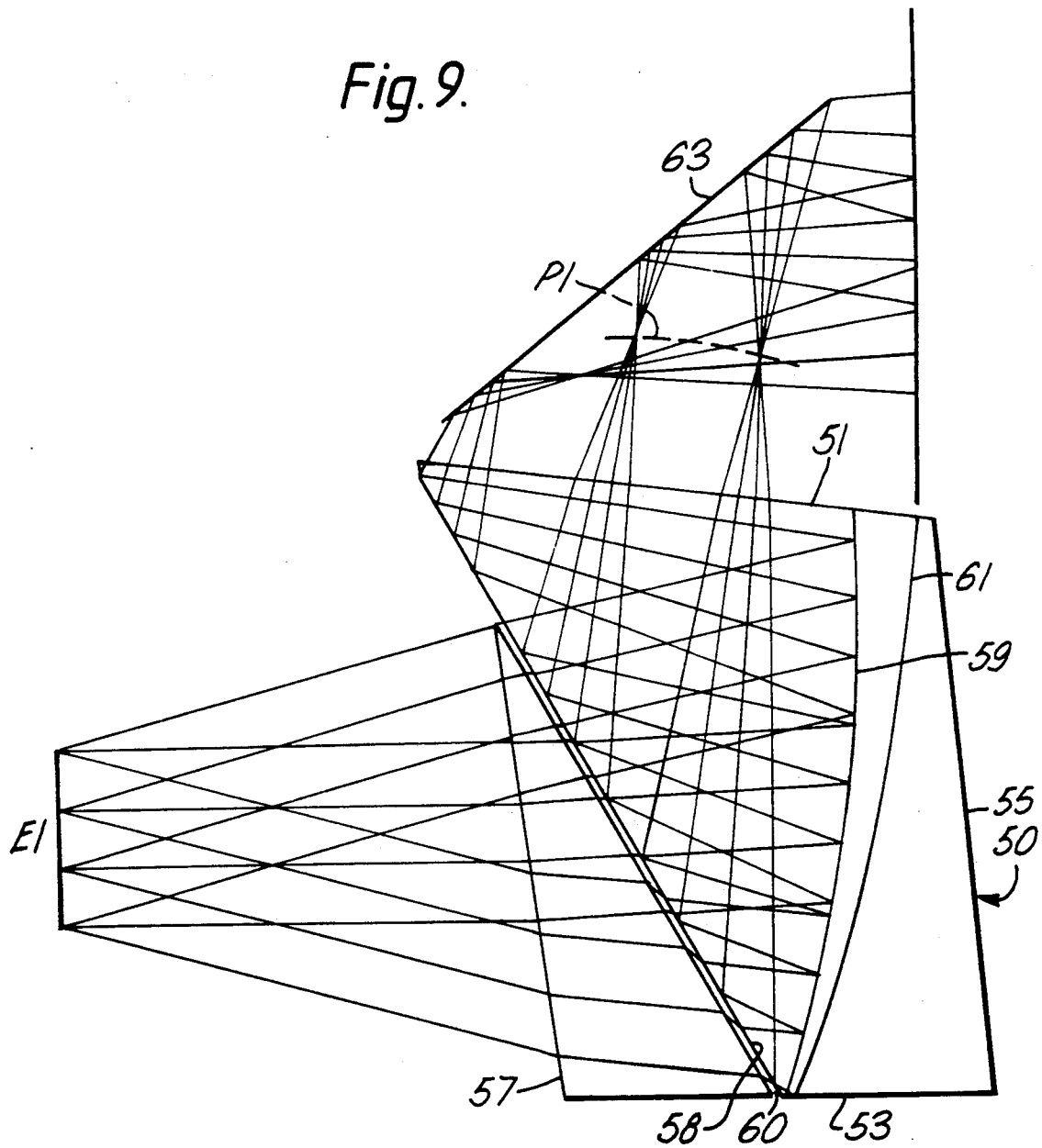

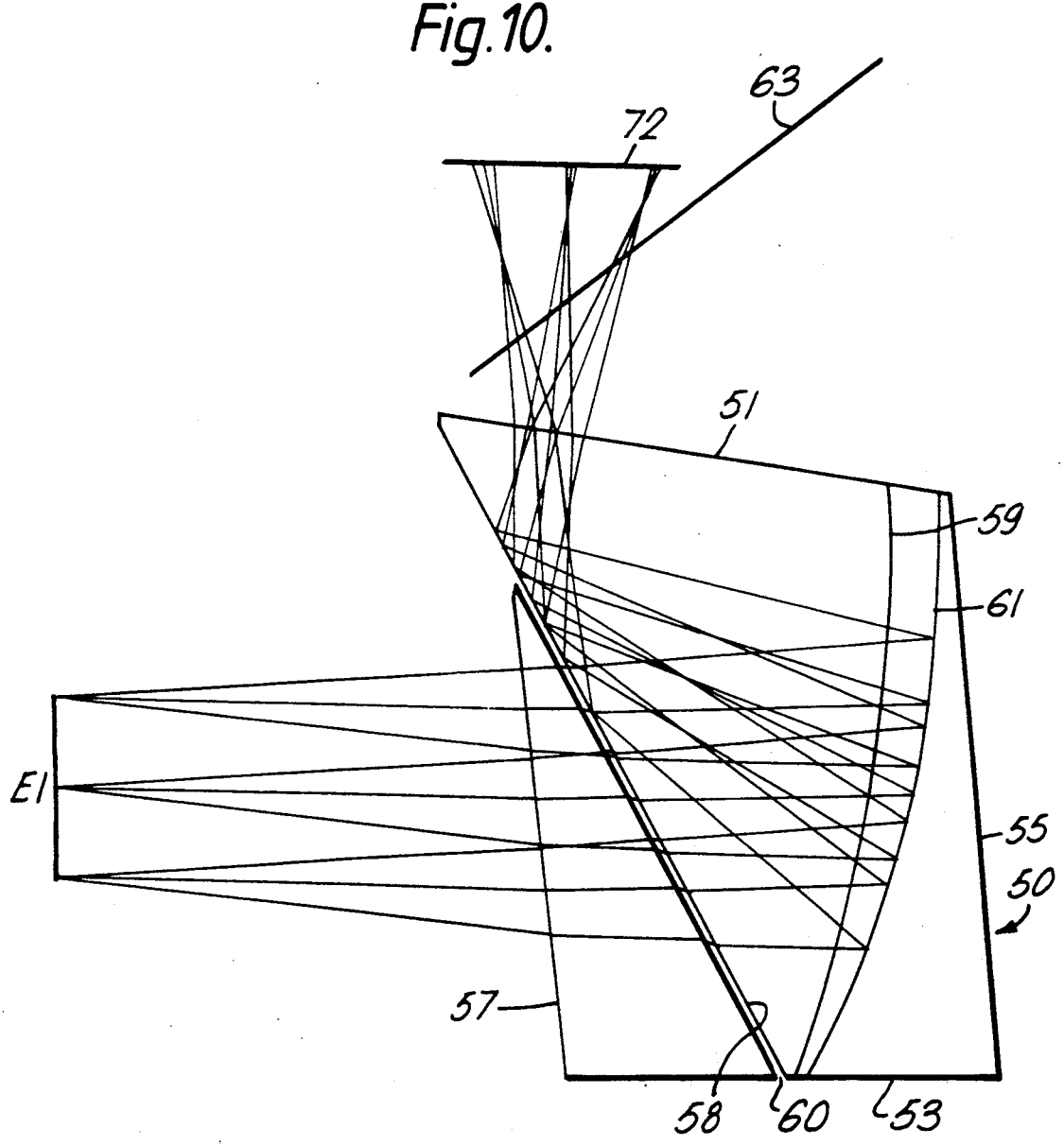

# HELMET SYSTEMS WITH EYEPIECE AND EYE POSITION SENSING MEANS

BACKGROUND OF THE INVENTION

This invention relates to helmet systems.

More particularly the invention relates to helmet mounted display systems by which is meant a system comprising a helmet and, carried, in part at least, thereby, apparatus for conveying to the helmet wearer, a display of intelligence relevant to the helmet wearer's role.

DESCRIPTION OF RELATED ART

The steadily increasing functional demands to be satisfied by helmet mounted display systems, especially aircrew systems, has led, inter alia, to the realisation of helmet carried displays calculated to supersede the now conventional head-up display systems wherein the display unit is mounted boresighted with respect to the airframe.

Such helmet mounted display systems must, to achieve accuracies in, in particular, weapon aiming, comparable to those achievable using a conventional head-up display system, comprise not only some form of collimated display arrangement, whereby bright data presented at e.g. the face of a cathode ray tube carried by the helmet is conveyed to the eye of the helmet wearer as virtual image at infinity by reflection at a see-through final element of an optical system of which the cathode ray tube is the first element, but also a helmet position, especially angular position, sensing sub-system carried in part by the helmet and in part by the airframe. The helmet position detection sub-system develops outputs from which the instantaneous angular relationships between helmet and airframe axes may be computed in so-called real time.

Whilst such a composite helmet system promises to serve as a replacement for the conventional airframe boresighted head-up display system there exists a further requirement for a sub-system for sensing angular eye position of the helmet wearer with respect to aircraft axes using the intermediate agency of the aforementioned helmet position sensing sub-system.

SUMMARY OF THE INVENTION

According to the present invention there is provided a helmet system comprising a helmet and, carried by the helmet, an optical arrangement incorporating: an eyepiece having a rearwardly facing, concavely curved, first element exhibiting substantial reflectivity to light within a narrow visible waveband and substantial transmissivity to visible light other than that within the said visible waveband; an areally extensive bright-image-forming source emissive of light within said visible waveband; and between said source and said eyepiece, an optical relay arrangement including an inclined reflector operable to fold rays of light emitted by said source within said visible waveband for incidence with said eyepiece, said optical relay arrangement per se and the position of said optical relay arrangement relative to said source and said eyepiece being such as to form an intermediate real image of said source substantially coincident with the principal focal plane of said first element, whereby said source appears at an eye position defined by said helmet in the line-of-sight through said eyepiece as a virtual image at infinity, wherein: said inclined reflector is substantially transmissive to infra-red radiation within an infra-red waveband; said eyepiece incorporates a second rearwardly facing concavely curved element which is substantially reflective to infra-red radiation within said infra-red waveband and substantially transmissive to visible light; there is located on the side of said inclined reflector remote from said eyepiece an areally extensive sensor operable to develop an electrical output representative of the position of incidence within a sensing area of the sensor of infra-red radiation, within said infra-red waveband, brought substantially to focus on said sensing area; and there is substantially coincident with the principal focus of said second element an infra-red source emissive of infra-red radiation within said infra-red waveband, the arrangement being such that when said system is in use with an eye located at said eye position, infra-red radiation from said infra-red source is reflected collimated by said second element through said eyepiece to said eye position, partially reflected by said eye at said eye position and brought substantially to focus at a position within the sensing area of said sensor, said position corresponding to the angular position of said eye with respect to helmet axes.

In one such system: the eyepiece incorporates, between said first element and said eye position, a beam splitter element which is separated from said first element by an air space; the optical relay arrangement has first and second angularly displaced lens groups; said inclined reflector is positioned so as to fold light rays within said visible waveband from said source, having passed through the first lens group, to the second lens group for transmission thereby for reflection at said beam splitter element; there is, between the second lens group and the beam splitter element, an intermediate beam splitter which is both reflective and transmissive to infra-red radiation within said infra-red waveband and substantially transmissive to the light within said visible waveband transmitted by the second lens group; and said infra-red source is located on one side of said intermediate beam splitter, infra-red radiation from said infra-red source being folded first by the intermediate beam splitter and then by said beam splitter element of the eyepiece.

In another such helmet system: said eyepiece comprises a body of light refractive material having a light input face, a boundary surface opposite said input face, substantially flat and parallel fore and aft faces, and internally of said body bridging the space between said input face and said boundary surface an areally extensive region comprising first and second faces constituting respectively said first and second elements of said eyepiece, such that light entering said eyepiece at said input face is internally reflected forwardly towards said areally extensive region, partially reflected by said areally extensive region rearwardly towards said aft face, and transmitted through said aft face; said relay arrangement includes a lens arrangement, light from said source passing through said lens arrangement and being folded by said inclined reflector so as to form said intermediate real image and be incident on said input face of the eyepiece; and said inclined reflector folds rays from an infra-red radiation emitter so as to produce a real image of said infra-red radiation emitter, said real image constituting said infra-red source.

BRIEF DESCRIPTION OF THE DRAWINGS

Two helmet systems in accordance with the present invention will now be described, by way of example, with reference to the accompanying drawings in which:

FIG. 1 is a front elevation of the first system
FIG. 2 is a side elevation of the first system;
FIG. 8 shows in the display unit of the second system a ray tracing of rays from an i.r. radiation point source to an i.r. sensor device via reflection at an eye at the eye position of the display unit;
and
FIGS. 9 and 10 show on an enlarged scale the solid optics eyepiece of the second system, FIG. 9 being a ray tracing relevant to the function of the eyepiece in providing a collimated display, FIG. 10 being a ray tracing relevant to the function of the eyepiece in the sensing of the angular position of the eye.

DETAILED DESCRIPTION OF THE PREFERRED EMBODIMENTS

Figure 4:
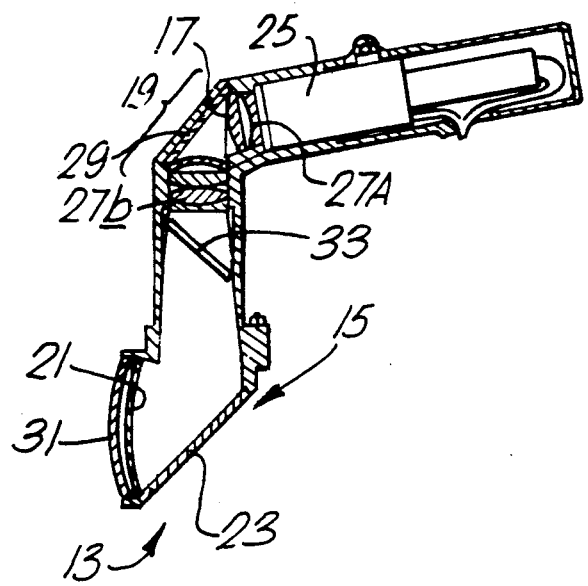
FIG. 4 is a section on the line IV—IV of FIG. 1.

Referring to FIGS. 1 to 4, the first helmet system has a helmet 11, a helmet carried display sub-system 13 and the helmet mounted portion of a helmet position detection sub-system (not shown).

The helmet position detection sub-system mentioned above may be of any suitable form. It may rely on optical principles in its operation. Typical of such optical systems is the sub-system the subject of UK Patent No. 1520154. It may rely on acoustical principles. Alternatively, it may rely on an electromagnetic (inductive) coupling between a helmet mounted arrangement, e.g. a transmitter, and an airframe mounted arrangement, e.g. a receiver. Typical of this last kind is the a.c. electromagnetic helmet pointing system described in U.S. Pat. No. 4737794. Another such electromagnetic helmet pointing sub-system, relying on pulsed d.c. waveforms, is described in PCT Patent application No. WO 88/02844.

To be comparable in performance to the airframe boresighted head-up display system the helmet pointing system should, regardless of the technology employed, have an accuracy of the order of a milliradian; but, for some roles or uses, the accuracy may be significantly less.

The helmet carried display sub-system 13 incorporates an eyepiece 15, an areally extensive bright-image-forming source 17 and, between the eyepiece 15 and the image forming source 17, an optical relay arrangement 19.

Figure 5:
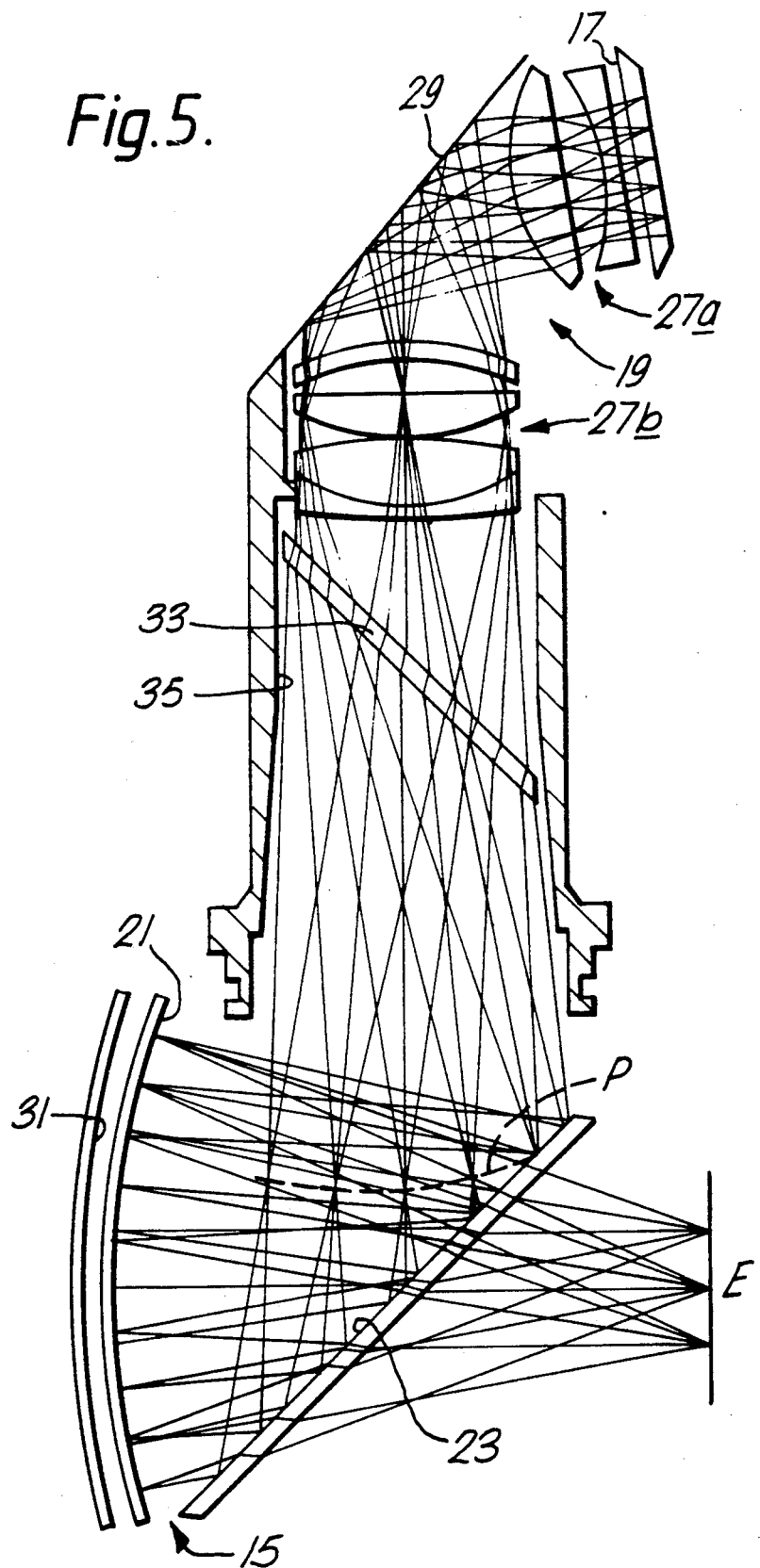
FIG. 5 shows a first ray tracing through a display unit of the first system, being a ray tracing of rays from a cathode ray tube of the display unit to an eye position by way of an eyepiece of the open optics type of the display unit.
Figure 6:
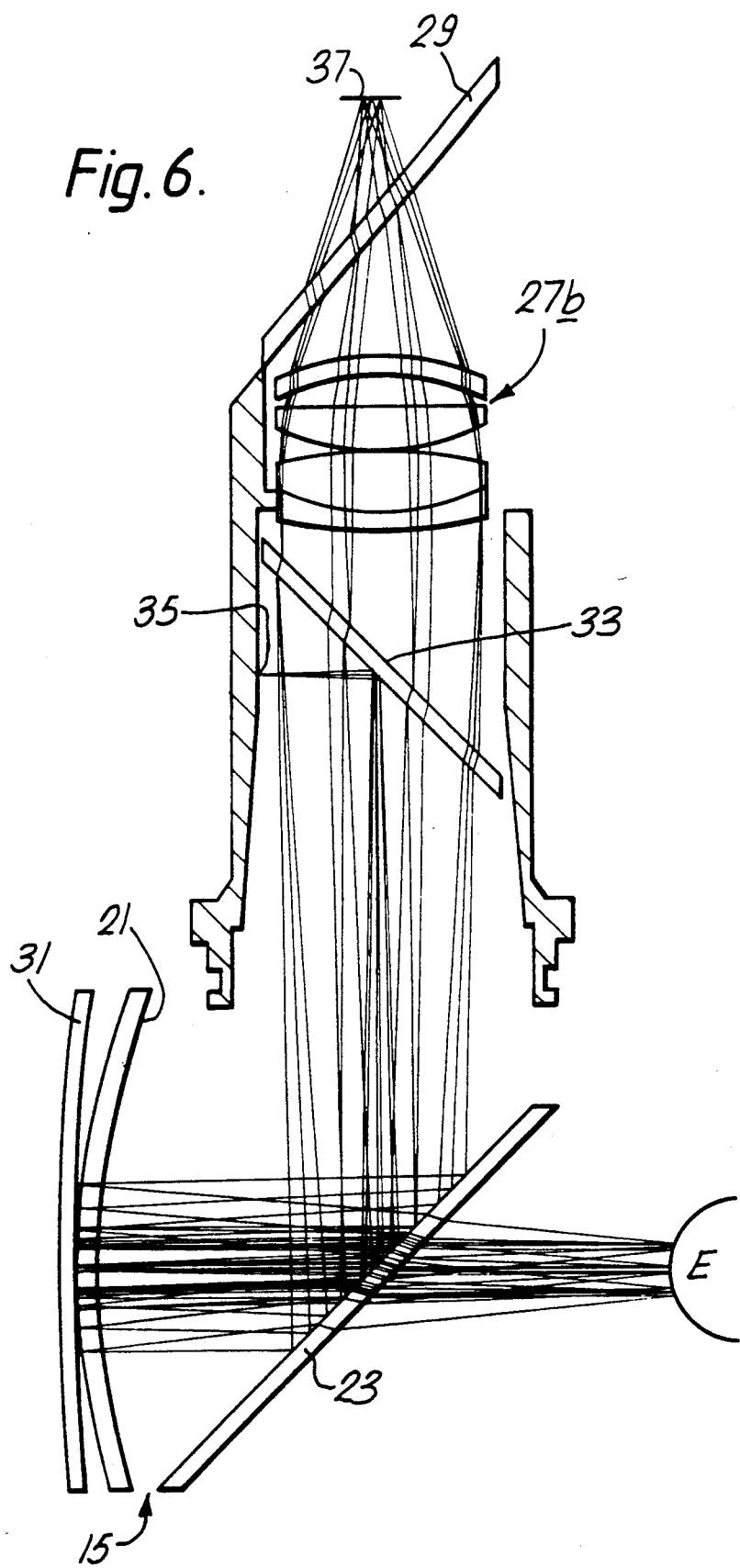
FIG. 6 shows a second ray tracing through the display unit of the first system, being a ray tracing of rays from an infra-red (i.r.) radiation point source incorporated in the display unit to an i.r. sensor device via reflection at an eye at the eye position.

Referring to FIGS. 5 and 6, the eyepiece 15 has a rearwardly facing, substantially spherical first element 21 exhibiting substantial reflectivity to light within a certain narrow visible waveband and substantial tranmissivity to light within a certain i.r. waveband and to visible light not within the certain narrow visible waveband, and, between the element 21 and a design eye position E defined by the helmet, a fore and aft inclined planar beam splitter element 23 exhibiting both light-reflective and light-transmissive properties within the certain narrow visible waveband and within the certain i.r. waveband and substantially full transmissivity to visible light not within the certain narrow visible waveband.

The areally extensive bright-image-forming source 17 is constituted by the phosphor screen of a cathode ray tube (c.r.t.) 25.

The optical relay arrangement 19 comprises first and second angularly displaced lens groups 27a, 27b and between the two lens groups a relay arrangement reflector 29 operable to fold rays from the c.r.t. face 17, having passed through lens group 27a, through the angularly displaced lens group 27b to incidence with the eyepiece beam splitter element 23.

The optical relay arrangement 19 per se and the position of the arrangement 19 relative to the face 17 of the c.r.t. 25 is such as to form a substantially planar intermediate real image P of the face 17 substantially coincident with the principal focal plane of the spherical element 21 of eyepiece 15, taking into account the folding action of the eyepiece beam splitter element 23.

The contour of the real image P is such that light rays from the c.r.t. 25 incident on the beam splitter element 23 are reflected thereby to the spherical element 21. There the rays are reflected back substantially collimated from all reflection points on element 21, and transmitted by the eyepiece beam splitter element 23 to define an exit pupil centred on the design eye position E.

As a result a wearer of the helmet with his eye at any position within the exit pupil is provided with a virtual image, nominally at infinity, of the c.r.t. face 17 and, of course, the bright imagery presented thereat.

Because of the close proximity of the real image P to the design eye position E (discounting the folding action of the element 23), the helmet wearer is provided with a large instantaneous field of view of the collimated virtual image of the c.r.t. display against the forward scene viewed through the eyepiece 15.

The eyepiece 15 has a second rearwardly facing substantially spherical element 31, of focal length greater than that of the spherical element 21, exhibiting substantial reflectivity to i.r. radiation within the certain i.r. waveband whilst exhibiting substantial transmissivity to visible light.

Between the eyepiece beam splitter element 23 and the second lens group 27b there is a further beam splitter element 33 and, on the side of the beam splitter 33 at the principal focus of the second element 31 there is an i.r. point source 35 emissive of i.r. radiation in the certain infra-red waveband. On the side of the beam splitter 29 remote from the eyepiece 15 there is an areally extensive sensor 37. The sensor 37 is operable to develop an electrical output representative of the position of incidence within its sensing area of i.r. radiation, within the certain i.r. waveband, brought substantially to focus on the sensing area.

In use with an eye located at the design eye position E, i.r. radiation from the point source 35 is reflected, collimated by the second spherical element 31 through the eyepiece to the design eye position E. Infra-red radiation reflected at the cornea of the eye located at the design eye position E is brought to point focus at a position within the sensing area of the sensor 37 corresponding to the angular position of the eye with respect to helmet axes. As shown by the ray tracing in FIG. 6, the passage of i.r. radiation between the source 35 and sensor 37 involves, successively, reflection at the intermediate beam splitter element 33, reflection at the eyepiece beam splitter 23, reflection at the second spherical element 31, transmission by the eyepiece beam splitter element 23, reflection by the eye at design eye position E, transmission by the element 23, reflection at the spherical element 31, reflection at element 23 and transmission by element 33, second lens group 27b and splitter 29.

Referring to FIGS. 7 to 10, the second helmet system includes an eyepiece 50 comprising a body of light refractive material having a light input face 51, a boundary surface 53 opposite the input face 51, substantially flat and parallel fore 55 and aft 57 faces, and internally of the body bridging the space between the input face 51 and the boundary surface 53 an areally extensive region comprising first 59 and second 61 substantially spherical rearwardly facing faces. The body further has a partially light reflective partially light transmissive face 58 at an interface 60 between parts of the body. The faces 59 and 61 have the same reflection and transmission characteristics as regards visible light and infra-red radiation as the first 21 and second 31 elements respectively of the first helmet system described above. Light entering the eyepiece 50 at the input face 51 is internally reflected forwardly by face 58 towards the areally extensive region, partially reflected by the areally extensive region rearwardly towards face 58, transmitted by face 58 towards the aft face 57, and transmitted through the aft face 57.

The second helmet system further includes a relay arrangement, comprising a reflector 63 constituted by a beam splitter having the same reflection and transmission characteristics as regards visible light and infra-red radiation as the beam splitter constituting the reflector 29 of the first helmet display system described above and a lens arrangement 65, and an areally extensive source constituted by the output face 67 of a c.r.t. (not shown). The face 67 is disposed on one side of a further beam splitter 69, on the other side of which splitter 69 there is disposed a point emitter 71 of infra-red radiation emissive of i.r. radiation in the certain infra-red waveband.

Figure 7:
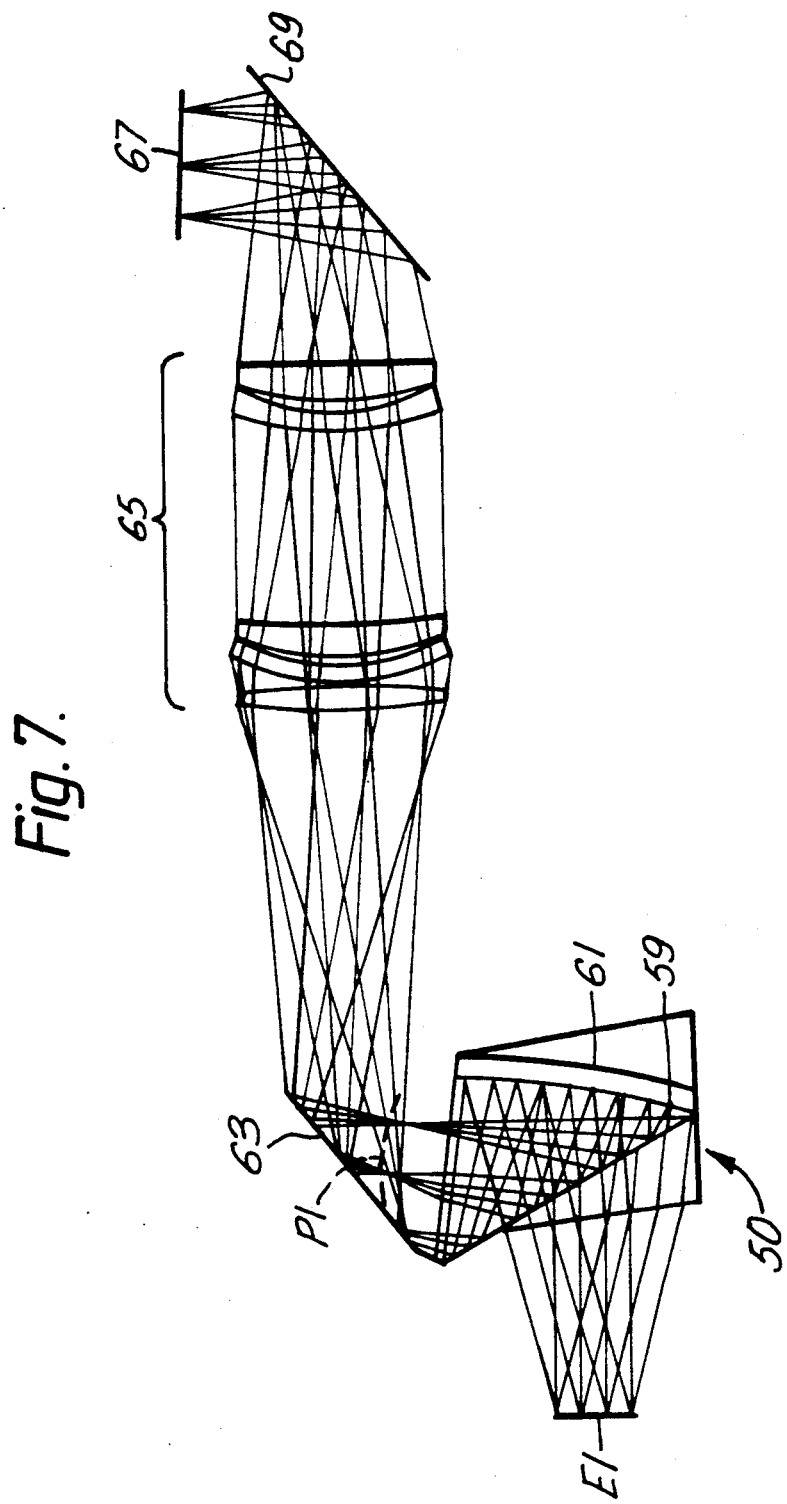
FIG. 7 is a schematic view of a display unit of the second system shown divorced from the helmet of the second system, being a display unit incorporating an eyepiece of the solid optics type, the schematic view showing a ray tracing of rays from a cathode ray tube of the display unit to an eye position by way of the solid optics eyepiece.

In use of the second helmet system, as shown in FIGS. 7 and 9, with an eye located at design eye position E1 defined by the helmet of the second system, an intermediate real image P1 of the source 67 is produced adjacent the eyepiece 50, light from the source 67 passing through the lens arrangement 65 and being folded by the relay arrangement reflector 63 in the formation of the image P1. The eyepiece 50 is located with respect to the relay arrangement reflector 63 so that the image P1 of the areally extensive source 67 is formed substantially coincident with the principal focal plane of the first face 59. After forming the image P1, light from the source 67 is incident on the input face 51 of the eyepiece 50 and is directed and collimated, as shown in FIG. 9, by the eyepiece 50 so as to reach the eye at design eye position E1.

Further, in use of the second helmet system, as shown in FIGS. 8 and 10, the reflector 63 folds rays from the i.r. emitter 71 so as to produce a real image 71A of the i.r. emitter 71. This real image 71A is substantially coincident with the principal focal point of the second curved face 61 of the eyepiece 50. After forming this real image 71A, light from the i.r. emitter 71 enters eyepiece 50 at input face 51, and is directed, as shown in FIG. 10, by eyepiece 50 towards the eye at design eye position E1. Infra-red radiation reflected at the cornea of the eye is brought, by the eyepiece 50, to point focus at a position within a sensing area of a sensor 72.

Figure 3:
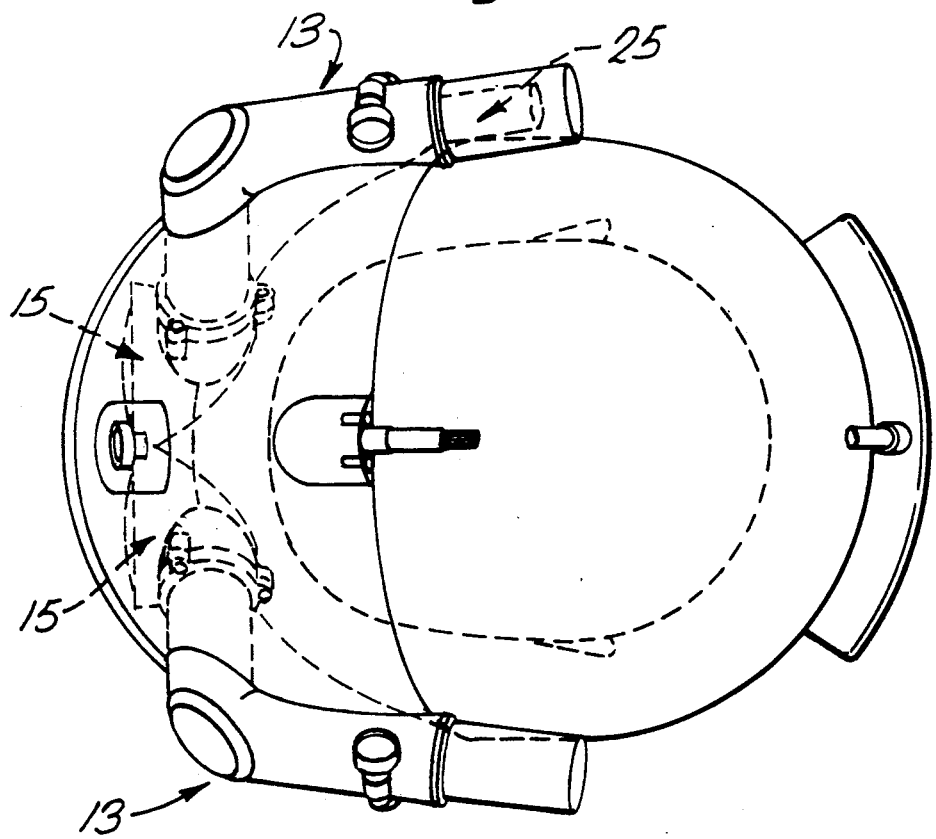
FIG. 3 is a plan view of the first system.

Each of the first and second helmet systems comprises two sub-systems as described above with reference to FIGS. 4, 5 and 6 or FIGS. 7 to 10, one being carried at each side of the helmet (as shown in FIGS. 1, 2 and 3 for the first helmet system) with its eyepiece before the right or left eye of the helmet wearer as the case may be.

I claim:
1. A helmet system comprising a helmet and, carried by the helmet, an optical arrangement incorporating: an eyepiece having a rearwardly facing, concavely curved, first element exhibiting substantial reflectivity to light within a narrow visible waveband and substantial transmissivity to visible light other than that within the said visible waveband; an areally extensive bright-image-forming source emissive of light within said visible waveband; and between said source and said eyepiece, an optical relay arrangement including an inclined reflector operable to fold rays of light emitted by said source within said visible waveband for incidence with said eyepiece, said optical relay arrangement per se and the position of said optical relay arrangement relative to said source and said eyepiece being such as to form an intermediate real image of said source substantially coincident with the principal focal plane of said first element, whereby said source appears at an eye position defined by said helmet in the line-of-sight through said eyepiece as a virtual image at infinity, wherein: said inclined reflector is substantially transmissive to infra-red radiation within an infra-red waveband; said eyepiece incorporates a second rearwardly facing concavely curved element which is substantially reflective to infra-red radiation within said infra-red waveband and substantially transmissive to visible light; there is located on the side of said inclined reflector remote from said eyepiece an areally extensive sensor operable to develop an electrical output representative of the position of incidence within a sensing area of the sensor of infra-red radiation, within said infra-red waveband, brought substantially to focus on said sensing area; and there is substantially coincident with the principal focus of said second element an infra-red source emissive of infra-red radiation within said infra-red waveband, the arrangement being such that when said system is in use with an eye located at said eye position, infra-red radiation from said infra-red source is reflected collimated by said second element through said eyepiece to said eye position, partially reflected by said eye at said eye position and brought substantially to focus at a position within the sensing area of said sensor, said position corresponding to the angular position of said eye with respect to helmet axes.

2. A system according to claim 1 wherein: the eyepiece incorporates, between said first element and said eye position, a beam splitter element which is separated from said first element by an air space; the optical relay arrangement has first and second angularly displaced lens groups; said inclined reflector is positioned so as to fold light rays within said visible waveband from said source, having passed through the first lens group, to the second lens group for transmission thereby for reflection at said beam splitter element; there is, between the second lens group and the beam splitter element, an intermediate beam splitter which is both reflective and transmissive to infra-red radiation within said infra-red waveband and substantially transmissive to the light within said visible waveband transmitted by the second lens group; and said infra-red source is located on one side of said intermediate beam splitter, infra-red radiation from said infra-red source being folded first by the intermediate beam splitter and then by said beam splitter element of the eyepiece.

3. A system according to claim 1 wherein: said eyepiece comprises a body of light refractive material having a light input face, a boundary surface opposite said input face, substantially flat and parallel fore and aft faces, and internally of said body bridging the space between said input face and said boundary surface an areally extensive region comprising first and second faces constituting respectively said first and second elements of said eyepiece, such that light entering said eyepiece at said input face is internally reflected forwardly towards said areally extensive region, partially reflected by said areally extensive region rearwardly towards said aft face, and transmitted through said aft face; said relay arrangement includes a lens arrangement, light from said source passing through said lens arrangement and being folded by said inclined reflector so as to form said intermediate real image and be incident on said input face of the eyepiece; and said inclined reflector folds rays from an infra-red radiation emitter so as to produce a real image of said infra-red radiation emitter, said real image constituting said infra-red source.

* * * * *